United States Patent [19]

Neuman

[11] Patent Number: 5,700,982
[45] Date of Patent: *Dec. 23, 1997

[54] SYMMETRICAL LOAD CELLS FOR USE IN CONJUNCTION WITH ROTARY MACHINES

[75] Inventor: Eli Neuman, Magdiel, Israel

[73] Assignee: Tedea-Huntleigh International, Ltd., Herzliya, Israel

[*] Notice: The term of this patent shall not extend beyond the expiration date of Pat. No. 5,646,375.

[21] Appl. No.: 377,050

[22] Filed: Jan. 23, 1995

[51] Int. Cl.$^6$ .................................................. G01G 23/26
[52] U.S. Cl. .......................... 177/229; 177/54; 177/58; 177/83; 141/83
[58] Field of Search .................... 177/54, 58, 83, 177/84, 229; 73/862.634, 862.639; 141/83

[56] References Cited

U.S. PATENT DOCUMENTS

| | | | |
|---|---|---|---|
| 2,603,442 | 7/1952 | Snyder et al. | 141/83 |
| 2,901,209 | 8/1959 | Bardy et al. | 141/83 |
| 3,004,231 | 10/1961 | Laimins | 73/862.634 |
| 3,215,173 | 11/1965 | Rutherford | 141/83 |
| 3,339,651 | 9/1967 | Garnett | 141/83 |
| 4,037,675 | 7/1977 | Storace et al. | 177/229 |
| 4,230,195 | 10/1980 | Graffin | 177/1 |
| 4,582,102 | 4/1986 | Risser | 141/95 |
| 4,616,511 | 10/1986 | Gindy et al. | 73/862.634 |
| 4,632,198 | 12/1986 | Uchimura | 177/211 |
| 4,690,230 | 9/1987 | Uchimura et al. | 177/229 |
| 4,838,369 | 6/1989 | Albert | 177/229 X |
| 4,928,473 | 5/1990 | Nagao et al. | 177/58 |
| 5,183,125 | 2/1993 | Schurr | 177/229 X |
| 5,440,078 | 8/1995 | Schuler | 177/229 X |
| 5,525,762 | 6/1996 | Maaz et al. | 177/229 |

*Primary Examiner*—Michael L. Gellner
*Assistant Examiner*—Randy W. Gibson
*Attorney, Agent, or Firm*—Thomas I. Rozsa; Tony D. Chen

[57] ABSTRACT

A weighing device which is dedicated for use on a rotary table of a rotary machine such as a rotary fluid filling machine. The weighing device includes a symmetrical load cell. The symmetry of the load cell when installed in place on the rotary table is such that it is symmetrical about a line which is perpendicular to a radius line emanating from the center of rotation. The load is applied directly or indirectly at the center point of the load cell. It is then understood that this load point is also on the line of symmetry.

38 Claims, 3 Drawing Sheets

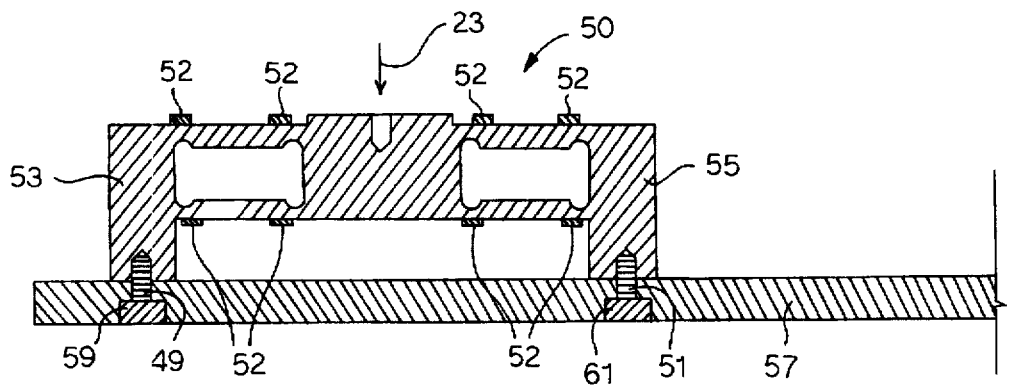
FIG. 6
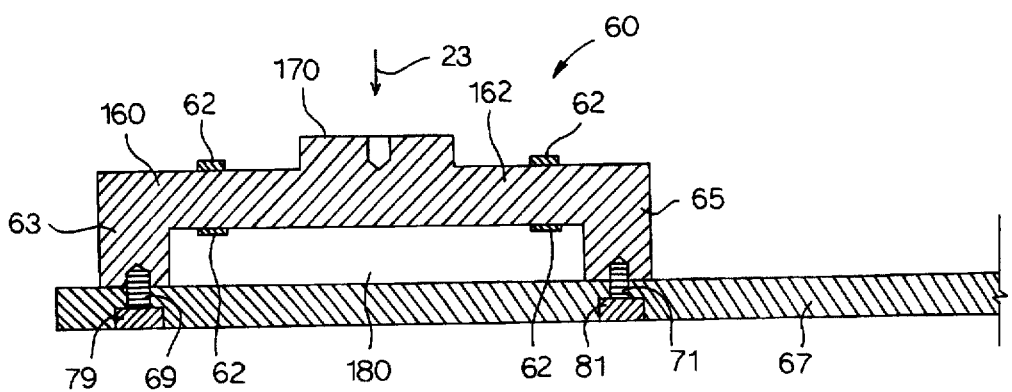
FIG. 7
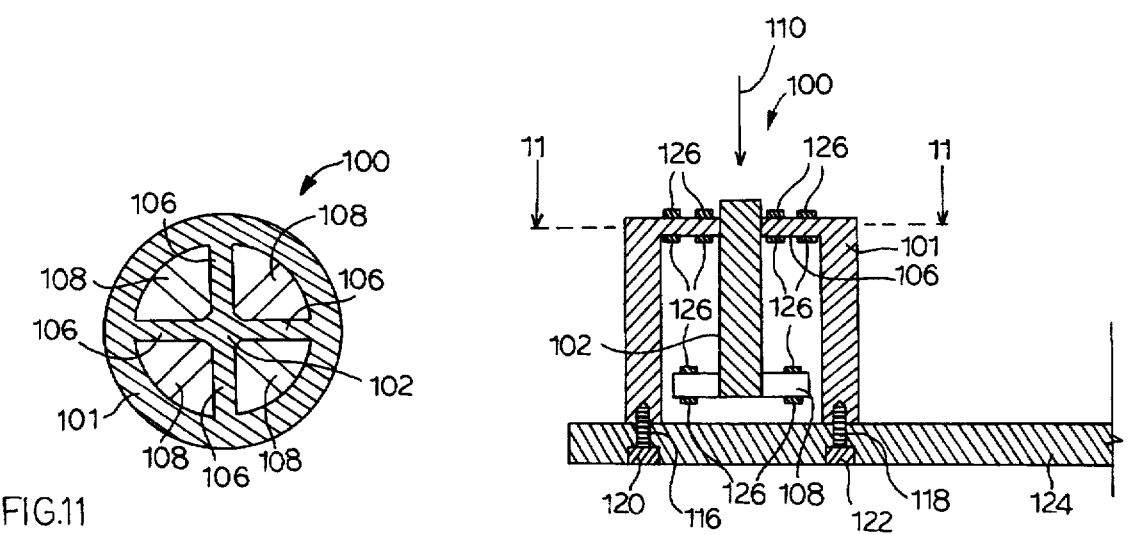
FIG. 11
FIG. 10

SYMMETRICAL LOAD CELLS FOR USE IN CONJUNCTION WITH ROTARY MACHINES

BACKGROUND OF THE INVENTION

1. Field of the Invention

The present invention generally relates to the field of weighing devices. More particularly, the present invention generally relates to the field of load cells used in conjunction with automatic rotary filling machines.

2. Description of the Prior Art

In the last ten years there has been a tendency to use gravimetric techniques or weighing, for filling liquid in containers, rather than the conventional volumetric filling.

Many filling machines consist mainly of a rotating table which has a plurality of weighing devices and filling heads. These weighing devices and filling heads are installed on the rotating table, whereby the weighing is performed during rotation and the weighing devices are subject to rotational acceleration.

One of the most common weighing devices for the filling machine application is a load cell which is a transducer for forces or weights. The load cell is normally installed on a line radiating from the center of the rotating table. The load cell has a lower mounting area at one end, which is fixed to the rotating table, and a load mounting area at the other end. When subject to a load, the load mounting area has a downward deflection. The rotational acceleration, which when multiplied by mass creates centrifugal force, is acting on the deflected mass to create a force moment which interferes with the accuracy of the weighing.

The following ten (10) prior art patents were uncovered in the pertinent field of the present invention:

1. U.S. Pat. No. 2,603,442 issued to Snyder et al. on Jul. 15, 1952 for "Apparatus For Weighing And Bagging Materials" (hereafter "the Snyder Patent");

2. U.S. Pat. No. 2,901,209 issued to Bardy et al. on Aug. 25, 1959 for "Container Filling Machine" (hereafter "the Bardy Patent");

3. U.S. Pat. No. 3,215,173 issued to Rutherford on Nov. 2, 1965 for "Bag Filling And Weighing Machine" (hereafter "the Rutherford Patent");

4. U.S. Pat. No. 3,339,651 issued to Garnett on Sep. 5, 1967 for "Weighing Apparatus" (hereafter "the Garnett Patent");

5. U.S. Pat. No. 4,037,675 issued to Storace et al. on Jul. 26, 1977 for "Leaf Spring Weighing Scale" (hereafter "the Storace Patent");

6. U.S. Pat. No. 4,230,195 issued to Graffin on Oct. 28, 1980 for "Automatic Control Method And Device For A Container Filling Apparatus" (hereafter "the Graffin Patent");

7. U.S. Pat. No. 4,582,102 issued to Risser on Apr. 15, 1986 for "Means For Electronically Comparing The Extent Of Fill In Containers With A Preset Extent" (hereafter "the Risser Patent");

8. U.S. Pat. No. 4,632,198 issued to Uchimura on Dec. 30, 1986 for "Multi-Range Load Cell Weighing Instrument" (hereafter "the '198 Uchimura Patent");

9. U.S. Pat. No. 4,690,230 issued to Uchimura et al. on Sep. 1, 1987 for "Multi-Range Load Cell Weighing Instrument" (hereafter "the '230 Uchimura Patent"); and 10. U.S. Pat. No. 4,928,473 issued to Nagao et al. on May 29, 1990 for "Device For Automatically Filling And Packing Predetermined Weight Of Product In Containers" (hereafter "the Nagao Patent").

The Snyder Patent discloses an apparatus for weighing and bagging materials. It includes a rotary weighing machine which has weighing units and are moved around a table.

The Bardy Patent discloses a container filling machine. The filling machine has a plurality of interrelated operations to dispense accurately measured and accurately weighed quantities of a material.

The Rutherford Patent discloses a bag filling and weighing machine. It includes a rotatable hub assembly with a circular platform. A plurality of scale supporting frame members are arranged to extend radially from the platform. A fixed bag supporting means is carried by each scale so that the weight in an attached bag will activate on the scale.

The Garnett Patent discloses a weighing apparatus. It includes a continuously traveling weigher head and a material receptacle. The weigher head has a scale beam supporting the receptacle. There is means to operate the receptacle during a phase in the cycle of the head travel to trim off therefrom an overweight of material.

The Storace Patent discloses a leaf spring weighing scale. The scale includes a weighing pan for receiving a load, and which is movably responsive to the load. A movable load support structure supports the weighing pan. A pair of load cells support the load support and measure its deflection. The load cells are arranged in tandem with one load cell being operative through a given portion of the weight range and the other being operative through the remaining portion of the weight range.

The Graffin Patent discloses an automatic control method and device for a container filling apparatus. The method includes the steps of sequentially taking containers filled in a multi-station filling machine. The weighing device at the weighing station of the transfer apparatus generates signals which are an image of the sensed weight of the successive containers sensed by the weighing device.

The Risser Patent discloses a means for electronically comparing the extent of fill in containers with a preset extent. It includes a rotary filling machine which has a rotating platform with stations on which bottles are supported for filling with liquid dispensed through filling head assemblies at each individual station.

The '198 Uchimura Patent discloses a multi-range load cell weighing instrument. It includes a high weighing load cell positioned adjacent a base and a low weighing load cell positioned adjacent a tray. The load cells are located such that the center lines along the length substantially coincide with the center line of the tray.

The '230 Uchimura Patent discloses a multi-range load cell weighing instrument. It includes means for supporting an article to be weighed, a low range load cell and a high range load cell. The low range load cell has a high accuracy weighing range and has means for outputting a first signal in response to a weight on the supporting means. The high range load cell has a high load weighing range which is higher than the high accuracy weighing range. The high range load cell includes means for outputting a weight signal as a function of one of the first and second signals.

The Nagao Patent discloses a device for automatically filling and packing a predetermined weight of product in containers. It includes a rotary table which has a plurality of weighing heads radially arranged and each provided with a weigher which includes a packing container holding mechanism instead of the weigh hopper.

None of these prior art patents have disclosed a weighing device which is designed and constructed for compensating dynamic forces in rotary machines, so that the weight of an object can be weighed accurately during rotation of the rotary table of the rotary machine. It is desirable to have a very efficient and also very effective design and construction of a weighing device which utilizes at least two load cells which are integrally connected to each other to thereby form a unitary device which has the load cells symmetrically oriented about the weighing device's loading point.

SUMMARY OF THE INVENTION

The present invention is a weighing device which is dedicated for use on a rotary table of a rotary machine such as a rotary fluid filling machine. The weighing device includes a symmetrical load cell. The symmetry of the load cell when installed in place on the rotary table is such that it is symmetrical about a line which is perpendicular to a radius line emanating from the center of rotation. The load is applied directly or indirectly at the center point of the load cell. It is then understood that this load point is also on the line of symmetry.

It has been discovered, according to the present invention, that prior art devices in rotary weighing are conventional load cells which are mounted on one side and loaded on the other side such that when loaded, the load cell is slightly deflected under the load. When the rotary table is rotating, the centrifugal forces act on the slight deflection creating a moment, which in turn results in an error. If the load cell is mounted with the loading point further away from the center of rotation, the effect of the moment will be to reduce the deflection "Y" (see FIG. 1), thus resulting in a negative error. If the load cell is mounted with the loading point closer to the center of rotation, the effect of the moment will be to increase the deflection "Y" thus resulting in a positive error.

It is therefore an object of the present invention to provide a weighing device which is symmetrical, such that when the load is applied at the center of symmetry, the resulting negative error on one side of the weighing device and a positive error on the other side of the weighing device are approximately identical, such that the errors cancel each other out.

It is the intention of the inventor to design load cells that will compensate for the errors created by the centrifugal forces on rotary machines.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 6 is a cross-sectional view of another embodiment of the present invention opposing symmetrical off-center load cells;

FIG. 7 is a cross-sectional view of still another embodiment of the present invention bending beam configuration;

FIG. 10 is a side cross-sectional view of another embodiment of the present invention symmetrical weighing device; and FIG. 11 is a top cross-sectional view taken along line 11—11 of FIG. 10.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
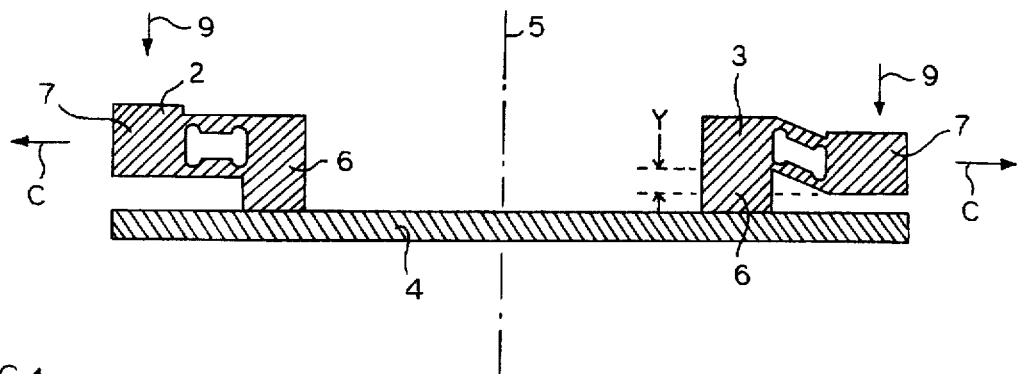
FIG. 1 is an illustrative diagram of the essential features of the prior art load cells which are mounted at opposite ends on a rotary table.

Referring to FIG. 1, there is shown prior art off-center (also referred to as single point) load cells 2 and 3 that are mounted to a rotating table 4 which rotates intermittently about a central axis 5. The off-center load cells 2 and 3 are mounted on one side 6 and loaded on the other side 7. When installed on the rotating table 4, the centrifugal forces "C" (shown with arrows) are acting perpendicularly to a load 9. These centrifugal forces "C" acting on the moment arm "Y" which is the deflection, create a moment "C" times "Y" which in the configuration shown will act against the load and will reduce the deflection. If the load cells were mounted reversed, with the load points 7 on the inside and the mounting points 6 on the outside of the rotating center 5, the "C" times "Y" moment will tend to increase the deflection "Y".

The off-center load cell 2 illustrates an unloaded condition, and the off-center load cell 3 illustrates a loaded condition where the centrifugal forces "C" are perpendicular to the load 9. These prior art load cells 2 and 3 are not symmetrical such that the centrifugal forces effect the weight readings.

Figure 2:
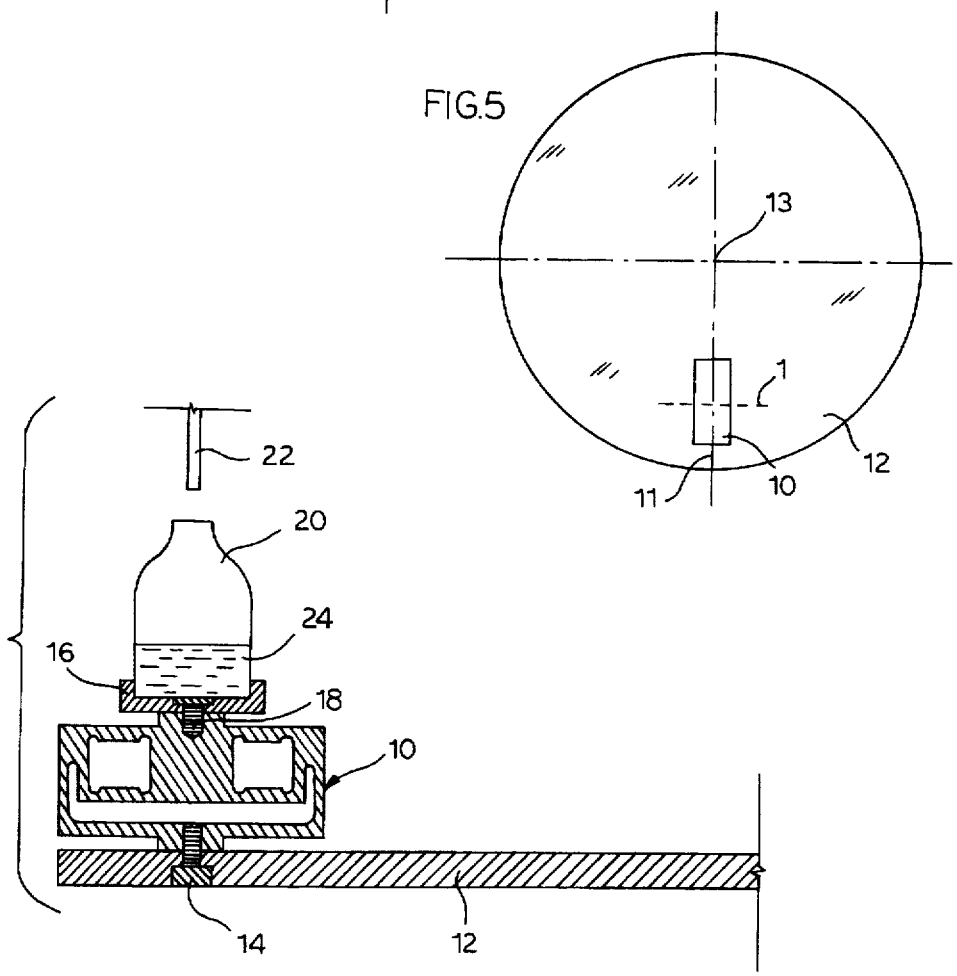
FIG. 2 is an illustrative diagram showing the preferred embodiment of the present invention weighing device which is mounted on a rotary table of a rotary machine.

Referring to FIG. 2, there is shown a partial cross-sectional view of the preferred embodiment of the present invention weighing device 10 incorporated in a rotary machine (not shown except for half of a rotary table). The weighing device 10 can be incorporated with the rotary machines (for example a rotary fluid filling machine) which has a rotating table or disc 12. The disc 12 may contain a multiplicity of individual stations with a weighing device connecting means 14 at each station. Each station comprises a load cell 10 and a weighing platform or container holding member 16 which is rigidly mounted on the load cell 10. The container holding member 16 in turn accepts and retains a container means 20. All portions of each station rotate on the rotating disc 12.

A filling apparatus (not shown) includes a plurality of nozzles 22 (only one is shown) which is utilized with the rotary filling machine. The plurality of nozzles 22 are located above the rotating table 12 of the rotary machine. The filling apparatus and the rotating table 12 are adapted to rotate synchronously so that the nozzle 22 and the container means 20 are together at an operating location. The nozzle 22 fills the container means 20 with fluid 24 during rotation of the rotating table 12 such that the weighing device 10 reads the weight accurately because the weighing device 10 comprises symmetrical load cells which compensate for dynamic forces caused by the rotation of the machine.

Figure 5:
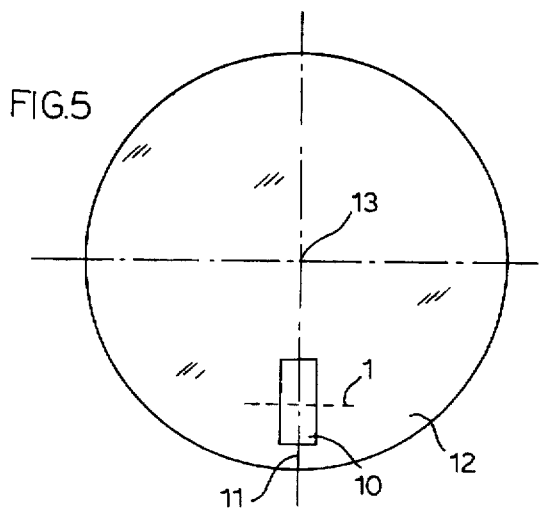
FIG. 5 is a top plan view of the weighing device which is mounted in a lengthwise direction and on a radius line of the rotary table.
Figure 4:
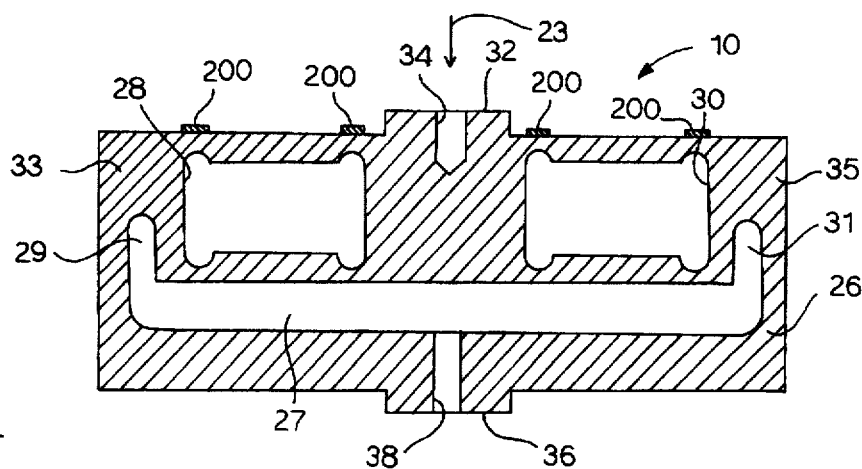
FIG. 4 is a cross-sectional view taken along line 4—4 of FIG. 3, showing the preferred embodiment of the present invention weighing device.
Figure 3:
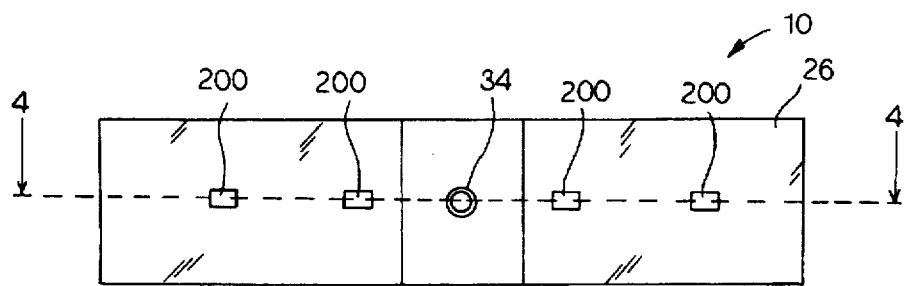
FIG. 3 is a top plan view of the preferred embodiment of the present invention weighing device.

FIG. 3 shows a top plan view of the present invention weighing device 10. FIG. 4 shows a cross-sectional view of the present invention weighing device 10. FIG. 5 illustrates a top plan view of the rotating disc 12 with the present invention weighing device 10 set on a radial line 11 from the center 13 of the rotating disc 12, such that the longitudinal axes of the load cells are aligned with the radial line 11 and also symmetrical about a line 1 perpendicular to the radial line 11. Referring to FIGS. 2, 3, 4 and 5, there is shown the weighing device 10 which includes a generally rectangular shaped body 26. The term off-center load cells means a load cell which can accurately measure weight regardless of the location of the weight. The rectangular shaped body 26 has a pair of opposing off-center load cells 28 and 30 integrally connected to each other and forming a unitary and symmetrical one piece weighing unit for compensating dynamic forces on the rotary fluid filling machine. The rectangular shaped body 26 has a top mounting end 32 with one or more connecting means 34 and a bottom mounting end 36 with an opposite one or more connecting means 38. The rectangular shaped body 26 is mounted to the rotating table 12 by having the connecting means 38 at the bottom mounting end 36 engaged with and mounted to the weighing device connecting means 14 of the rotating table 12. The weighing device 10 further comprises a horizontal interior opening 27 which permits the load cells 28 and 30 to deflect downward when a downward force 23 is applied to the weighing device 10. Each respective end of the interior opening 27 comprises a vertical opening 29 and 31 respectively which enable vertical walls 33 and 35 to be more compliant so they can conform to the geometry of the deflected load cells 28 and 30 when a force is applied so that the accuracy of the weighing device 10 is retained. The connecting means 34 at the top mounting end 32 receives an interconnecting means 18 of the weighing platform 16 and is engaged thereto. Once the weighing device 10 is installed on the rotating table 12 of the rotary machine, the weighing device 10 will rotate with the rotating table 12.

Referring to FIGS. 2 and 4, in weighing devices, such as the one described herein, the weight is ultimately determined by the pair of opposing load cells 28 and 30 which create a voltage corresponding to the weight of the object on the weighing platform 16. Although any suitable symmetrical weighing devices can be used, load cells typically contain strain gages 52 in the form of fine wires arranged in a pattern and cemented to a location on the load cell that will be subjected to physical strain. The fine wires will have a certain resistance when the metal to which it is cemented is not under strain. When the metal is distorted, the attached wires, due to their elastic properties, will be stretched. This in turn, reduces the wire cross section and increases its length so that the resistance within the wires is changed. The differences in resistance are converted to changes in voltage through the use of a basic bridge circuit. This configuration is commonly used in today's high accuracy load cells, although other configurations may be utilized with the load cells.

When a force or weight is placed on top of the weighing device 10, the force is transmitted down to the load cells 28 and 30. This arrangement causes both load cells 28 and 30 to deflect, resulting in the centrifugal forces causing a positive error on one side and an equal negative error on the other side. Since the total voltage output of the weighing device 10 is an electrical sum of both sides, the errors will be eliminated.

The present invention weighing device 10 can be made from several materials. By way of example, the weighing device 10 can be made of stainless steel or aluminum. The present invention conforms to conventional forms of manufacture or any other conventional way known to one skilled in the art. The present invention is easy to use so it provides a device that will be economically feasible, long lasting and relatively trouble-free in operation.

Referring to FIG. 6, there is shown at 50 a cross-sectional view of another embodiment of the present invention weighing device. Comparing the embodiment 50 to the preferred embodiment 10 illustrated in FIGS. 2 and 4, the preferred embodiment had a lower wall 25 which contained a connecting means 38 at a single central location which supports the walls 33 and 35 and supporting both of the load cells 28 and 30 respectively. The alternative embodiment weighing device 50 does not have a lower wall but instead has connecting means 49 and 51 at two separate locations which are in respective sidewalls 53 and 55. The connecting means 49 and 51 in turn connect to the weighing device 50 to the rotating table 57 at two locations by table connecting means 59 and 61. This embodiment also contains strain gages 52 comparable to the previous embodiment.

Referring to FIG. 7, there is shown at 60 a cross-sectional view of still another embodiment of the present invention weighing device. This embodiment illustrates a symmetrical bending beam load cell configuration as opposed to the off-center load cells. This embodiment of the weighing device 60 does not have a lower wall but instead has connecting means 69 and 71 at two separate locations which are in respective sidewalls 63 and 65. The connecting means 69 and 71 in turn connect the weighing device 60 to the rotating table 67 at two locations by table connecting means 79 and 81. The bending beam load cell 60 comprises two opposing bending beams 160 and 162 which are on opposite sides of the loading area 170 to which the force 23 is applied. The bending beams 160 and 162 are interconnected and are also symmetrical about the loading area 170. When the force is applied, both bending beams 160 and 162 deflect downwardly into opening 180 resulting in voltage output from strain gages 62 which is proportional to the force 23. Because the weighing device 60 is symmetrical about its loading area 170, errors resulting from the centrifugal forces will cancel each other in the manner previously discussed.

Figure 8:
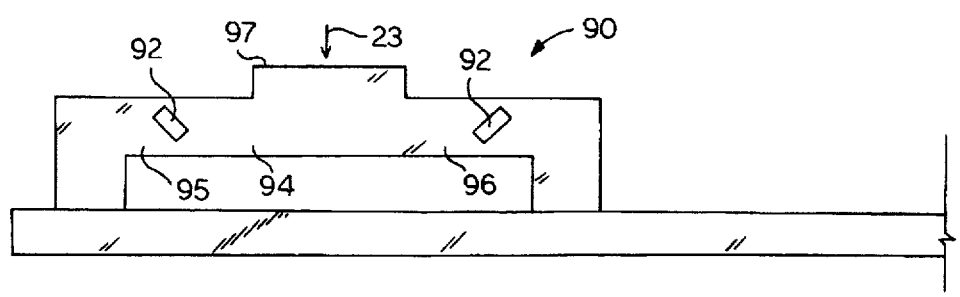
FIG. 8 is a side elevational view of still another embodiment of the present invention shear beam configuration.
Figure 9:
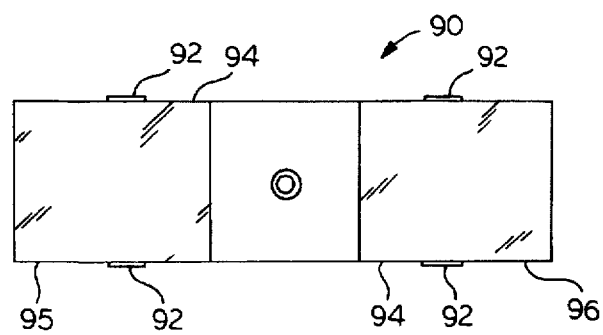
FIG. 9 is a top plan view of the embodiment shown in FIG. 8.

Referring to FIG. 8 and 9, there is shown at 90 another embodiment of the present invention weighing device. This embodiment illustrates a symmetrical shear beam load cell configuration as opposed to the off-center load cells. This embodiment of the weighing device 90 is similar to FIG. 7 but has strain gages 92 attached to vertical sides 94 of the weighing device 90. Shear beam load cells are used because they have partial off-center properties, although different in construction from off-center load cells. The shear beam load cell 90 comprises two opposing shear beams 95 and 96 which are on opposite sides of the loading area 97 to which a force 23 is applied. The shear beams 95 and 96 are interconnected to form a unitary member and are also symmetrical about the loading area 97. When the force is applied, both shear beams 95 and 96 deflect downward into opening 140 resulting in voltage output from strain gages 92 which is proportional to the force 23. The difference in this embodiment from the embodiment illustrated in FIG. 7 is that in the embodiment in FIG. 8, the strain gages 92 are bonded to the vertical surfaces 94 and are set at an angle to the horizontal plane. Because the weighing device 90 is symmetrical about its loading area 97, errors resulting from the centrifugal forces will cancel each other in the same manner previously discussed.

FIG. 10 shows another embodiment of the present invention weighing device 100. FIG. 11 shows a top cross-sectional view taken along line 11—11 of FIG. 10. Referring to FIGS. 10 and 11, the weighing device 100 is generally a cylindrical shaped body 101. The weighing device 100 has a central vertical column 102, two or more top horizontal beams 106 and two or more bottom horizontal beams 108. All of these beams are integrally connected (as one piece) to the central column 102 to the cylindrical shaped body 101. The beams in each level are evenly spaced around the vertical column 102. The weighing device 100 has a multiplicity of connecting means such as 116 and 118 which are located at evenly spaced locations at the bottom of the cylindrical body 102. The connecting means 116 and 118 in turn connect the weighing device 100 to the rotating table 124 at corresponding locations on the rotary table 124. Two such locations 120 and 122 are illustrated. The strain gages 126 are mounted on horizontal surfaces of the weighing device 100. The horizontal surfaces can be on top of the top beams 106 or on the bottom of those beams, or on the top or bottom surfaces of beams 108. The strain gages 126 don't have to be on all surfaces symmetrically but on selected one or more surfaces, so long as the strain gages 126 are placed symmetrically around the center.

The operation of this load cell 100 is based on the deflection of all top and bottom beams 106 and 108, in such a way that the central vertical beam 102 is translated slightly in the load direction 110. Similarly to the above mentioned configuration, because of the symmetry, there will be deflected beams further from the center of the rotary table and deflected beams closer to the center of the rotary table such that errors will cancel each other in the manner previously discussed.

It will be appreciated that the present invention is not limited to the embodiments illustrated in FIGS. 1 through 11. It is also within the spirit and scope of the present invention to have a multiplicity of different beam type configurations.

Defined in detail, the present invention is a weighing device for determining the weight of an object and used in conjunction with a rotary machine which has a rotary table including a plurality of individual stations with a weighing device connecting means at each station, each station has a weighing platform for holding a container means, the weighing device comprising: (a) a pair of opposing off-center load cells integrally connected to each other and forming a unitary and symmetrical body for compensating dynamic forces on said rotary machine, the unitary and symmetrical body having a bottom member with connecting means and a top end with connecting means, where the connecting means at the bottom member is mounted to said weighing device connecting means on said rotary table; (b) said weighing platform mounted to said connecting means at said top end of said unitary and symmetrical body for retaining said container means thereon to accurately weigh said object while said rotary table is rotating; and (c) said pair of opposing load cells operatively connected and providing an output signal corresponding to the load placed on said top end of said unitary and symmetrical body by said object; (d) whereby said weighing device can compensate dynamic forces on said rotary table of said rotary machine and can accurately weigh said object during rotation of said rotary table.

Defined broadly, the present invention is a weighing device for determining the weight of an object and used in conjunction with a rotary machine which has a rotary table including at least one individual station with a weighing connecting means, the at least one individual station has a weighing platform for holding a container means, the weighing device comprising: (a) at least two opposing load cells integrally connected to each other and forming a unitary and symmetrical body for compensating dynamic forces on said rotary machine, the unitary and symmetrical body having a bottom member and a top end, where the bottom member is mounted to said weighing connecting means of said rotary table; (b) means for attaching said weighing platform to said top end of said unitary and symmetrical body such that said container means is on said weighing platform for retaining said container means thereon to accurately weigh said object while said rotary table is rotating; and (c) said at least two opposing load cells operatively connected and providing an output signal corresponding to the load placed on said top end of said unitary and symmetrical body by said object; (d) whereby said weighing device can compensate dynamic forces on said rotary table of said rotary machine and can accurately weigh said object during rotation of said rotary table.

Defined more broadly, the present invention is a weighing device for determining the weight of an object and used in conjunction with a rotary machine which has a rotary table including at least one individual station with a connecting means, the at least one individual station has a weighing platform for holding a container means, the weighing device comprising: (a) at least two load cells connected to each other and forming a symmetrical body for compensating dynamic forces on said rotary machine, where one end of the symmetrical body is mounted to said connecting means of said rotary table and the other end is attached to said weighing platform to accurately weigh the object while said rotary table is rotating; and (b) said at least two load cells operatively connected and providing an output signal corresponding to the load placed on said symmetrical body by the object; (c) whereby said weighing device can compensate dynamic forces on said rotary table of said rotary machine and can accurately weigh the object during rotation of said rotary table.

Defined even more broadly, the present invention is a weighing device for determining the weight of an object while both the weighing device and the object are placed on a rotating table, the weighing device comprising: a load cell having at least two deflectable beams arranged symmetrically around the center of the load cell, at least some of which deflectable beams support means for measuring the deflection of the at least two beams and generating a proportional output signal, where the object to be weighed is place at a point which is integrally connected to the at least two deflectable beams and is also at the point of symmetry, such that when the load cell is placed on said rotating table with the line of symmetry perpendicular to a radial line emanating from the center of rotation, the beams deflected under the weight which are closer to the center of rotation will produce output signals with negative errors, and the beams deflected under the load which are further away from the center of rotation will produce output signals with essentially equal but positive errors, thus resulting in a summed output in which the negative errors cancel the positive errors to produce accurate weighing.

Also alternatively defined in detail, the present invention is a weighing device for determining the weight of an object and used in conjunction with a rotary machine which has a rotary table including a plurality of individual stations with a weighing device connecting means at each station, each station has a weighing platform for holding a container means, the weighing device comprising: (a) a generally hollow cylindrical shaped body having a circumferential sidewall with a bottom end and a top end, the bottom end having connecting means for mounting to said weighing device connecting means on said rotary table; (b) a vertical cylindrical shaped loading column located centrally within said cylindrical shaped body and having a lower section with a lower end above said rotary table and an upper section with an upper end adjacent to said top end of said circumferential sidewall of said cylindrical shaped body, the top end having connecting means for connecting to said weighing platform; (c) at least two equally spaced apart thin flexible horizontal bottom beams integrally connected to said lower section of said vertical cylindrical loading column and extending radially and integrally connected to said circumferential sidewall of said cylindrical shaped body; (d) at least two equally spaced apart thin flexible horizontal top beams all being angularly offset from said at least two equally spaced apart thin flexible horizontal bottom beams and integrally connected to said upper section of said vertical cylindrical loading column and extending radially and integrally connected to said circumferential sidewall of said cylindrical shaped body; and (e) at least two equally spaced apart strain gages respectively attached to each said at least two equally spaced apart horizontal beams and lying generally on a horizontal plane for producing a voltage output proportional to the weight of said object; (f) whereby loading on said vertical cylindrical loading column creates deflection on said at least two horizontal top beams and similar deflection on said at least two horizontal bottom beams, thereby producing said voltage output proportional to the weight of said object that can accurately weigh said object during rotation of said rotary table.

Also alternatively defined broadly, a weighing device for determining the weight of an object and used in conjunction with a rotary machine which has a rotary table including at least one individual station with a connecting means, the at least one individual station has a weighing platform for holding a container means, the weighing device comprising: (a) a body having a sidewall with a bottom end and a top end, the bottom end having connecting means for mounting to said weighing device connecting means on said rotary table; (b) a vertical loading column located centrally within said body and having a lower section with a lower end above said rotary table and an upper section with an upper end adjacent to said top end of said sidewall of said body, the top end having connecting means for connecting to said weighing platform; (c) at least two equally spaced apart horizontal bottom beams integrally connected to said lower section of said vertical loading column and extending radially and integrally connected to said sidewall of said body; (d) at least two equally spaced apart horizontal top beams being angularly offset from said at least two equally spaced apart horizontal bottom beams and integrally connected to said upper section of said vertical loading column and extending radially and integrally connected to said sidewall of said body; and (e) at least two equally spaced apart strain gages respectively attached to each said at least two equally spaced apart horizontal beams and lying on a horizontal plane for producing a voltage output proportional to the weight of said object; (f) whereby loading on said vertical loading column creates deflection on said at least two horizontal top beams and similar deflection on said at least two horizontal bottom beams, thereby producing said voltage output proportional to the weight of said object that can accurately weigh said object during rotation of said rotary table.

Also alternatively defined more broadly, a weighing device for determining the weight of an object while both the weighing device and the object are placed on a rotating table, the weighing device comprising: (a) a body having a sidewall with a first end attached to said rotating table and a second end; (b) a loading support located within said body and having a first end and a second end; (c) at least two bottom beams integrally connected to said loading support and adjacent to said second end and extending radially and integrally connected to said sidewall of said body; (d) at least two top beams being angularly offset from said at least two bottom beams and integrally connected to said loading support and adjacent to said first end and extending radially and integrally connected to said sidewall of said body; and (e) means for producing a voltage output proportional to the weight of said object; (f) whereby loading on said loading support creates deflection on said at least two top beams and similar deflection on said at least two bottom beams, thereby producing said voltage output proportional to the weight of said object that can accurately weigh said object during rotation of said rotating table.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A weighing device for determining the weight of an object while both the weighing device and the object are placed on a rotating table, the weighing device comprising:
a load cell having at least two deflectable beams arranged symmetrically around the center of the load cell, at least some of which deflectable beams support means for measuring the deflection of the at least two beams and generating a proportional output signal, where the object being weighed is placed at a loading area which is integrally connected between the at least two deflectable beams and is also symmetrical about the loading area, such that when the load cell is placed on said rotating table, a symmetry line of the load cell is perpendicular to a radial line emanating from the center of said rotating table, the at least two deflectable beams deflected under the weight which are closer to the center of said rotating table will produce output signals with negative errors, and the at least two deflectable beams deflected under the load which are further away from the center of said rotating table will produce output signals with essentially equal but positive errors, thus resulting in a summed output in which the negative errors cancel the positive errors to produce accurate weighing.

2. The weighing device in accordance with claim 1 wherein each of said at least two deflectable beams are constructed as individual off-center load cells.

3. The weighing device in accordance with claim 1 wherein each of said at least two deflectable beams are constructed as bending beam load cells.

4. The weighing device in accordance with claim 1 wherein each of said at least two deflectable beams are constructed as shear beam load cells.

5. A weighing device for determining the weight of an object and used in conjunction with a rotary machine which has a rotary table including a plurality of individual stations with a weighing device connecting means at each station, each station has a weighing platform for holding a container means, the weighing device comprising:
 a. a pair of opposing off-center load cells integrally connected to each other and forming a unitary and symmetrical body for compensating dynamic forces on said rotary machine, the unitary and symmetrical body having a bottom member with connecting means and a top end with connecting means, where the connecting means at the bottom member is mounted to said weighing device connecting means on said rotary table;
 b. said weighing platform mounted to said connecting means at said top end of said unitary and symmetrical body for retaining said container means thereon to accurately weigh said object while said rotary table is rotating; and
 c. said pair of opposing load cells operatively connected and providing an output signal corresponding to the load placed on said top end of said unitary and symmetrical body by said object;
 d. whereby said weighing device can compensate dynamic forces on said rotary table of said rotary machine and can accurately weigh said object during rotation of said rotary table.

6. The weighing device in accordance with claim 5 wherein said unitary and symmetrical body is made of metal.

7. The weighing device in accordance with claim 5 wherein said unitary and symmetrical body is generally a rectangular shape.

8. The weighing device in accordance with claim 5 wherein said pair of load cells are 3-beam off-center configuration.

9. The weighing device in accordance with claim 5 wherein said pair of load cells are 2-beam off-center configuration.

10. The weighing device in accordance with claim 5 wherein said unitary and symmetrical body further comprises an interior horizontal space to permit deflection of said pair of opposing off-center load cells.

11. The weighing device in accordance with claim 10 wherein said bottom member functions as a support for outer sidewalls of said body.

12. The weighing device in accordance with claim 11 further comprising means to permit easier deflection of said outer sidewalls.

13. The weighing device in accordance with claim 12 wherein said means to permit easier deflection of said outer sidewalls comprises a pair of opposed vertical openings adjacent to respective opposite outer sidewalls.

14. A weighing device for determining the weight of an object and used in conjunction with a rotary machine which has a rotary table including at least one individual station with a weighing connecting means, the at least one individual station has a weighing platform for holding a container means, the weighing device comprising:
 a. at least two opposing load cells integrally connected to each other and forming a unitary and symmetrical body for compensating dynamic forces on said rotary machine, the unitary and symmetrical body having a bottom member and a top end, where the bottom member is mounted to said weighing connecting means of said rotary table;
 b. means for attaching said weighing platform to said top end of said unitary and symmetrical body such that said container means is on said weighing platform for retaining said container means thereon to accurately weigh said object while said rotary table is rotating; and
 c. said at least two opposing load cells operatively connected and providing an output signal corresponding to the load placed on said top end of said unitary and symmetrical body by said object;
 d. whereby said weighing device can compensate dynamic forces on said rotary table of said rotary machine and can accurately weigh said object during rotation of said rotary table.

15. The weighing device in accordance with claim 14 wherein said unitary and symmetrical body is made of metal.

16. The weighing device in accordance with claim 14 wherein said unitary and symmetrical body is generally a rectangular shape.

17. The weighing device in accordance with claim 14 wherein said at least two opposing load cells are 3-beam off-center configuration.

18. The weighing device in accordance with claim 14 wherein said at least two opposing load cells are 2-beam off-center configuration.

19. The weighing device in accordance with claim 14 wherein said at least two opposing load cells are bending beam configuration.

20. The weighing device in accordance with claim 14 wherein said at least two opposing load cells are shear beam configuration.

21. A weighing device for determining the weight of an object and used in conjunction with a rotary machine which has a rotary table including at least one individual station with a connecting means, the at least one individual station has a weighing platform for holding a container means, the weighing device comprising:
 a. at least two load cells connected to each other and forming a symmetrical body for compensating dynamic forces on said rotary machine, where one end of the symmetrical body is mounted to said connecting means of said rotary table and the other end is attached to said weighing platform to accurately weigh the object while said rotary table is rotating; and
 b. said at least two load cells operatively connected and providing an output signal corresponding to the load placed on said symmetrical body by the object;
 c. whereby said weighing device can compensate dynamic forces on said rotary table of said rotary machine and can accurately weigh the object during rotation of said rotary table.

22. The weighing device in accordance with claim 21 wherein said at least two load cells are 3-beam off-center configuration.

23. The weighing device in accordance with claim 21 wherein said at least two load cells are 2-beam off-center configuration.

24. The weighing device in accordance with claim 21 wherein said at least two load cells are bending beam configuration.

25. The weighing device in accordance with claim 21 wherein said at least two load cells are shear beam configuration.

26. A weighing device for determining the weight of an object and used in conjunction with a rotary machine which has a rotary table including a plurality of individual stations with a weighing device connecting means at each station, each station has a weighing platform for holding a container means, the weighing device comprising:

a. a generally hollow cylindrical shaped body having a circumferential sidewall with a bottom end and a top end, the bottom end having connecting means for mounting to said weighing device connecting means on said rotary table;

b. a vertical cylindrical shaped loading column located centrally within said cylindrical shaped body and having a lower section with a lower end above said rotary table and an upper section with an upper end adjacent to said top end of said circumferential sidewall of said cylindrical shaped body, the top end having connecting means for connecting to said weighing platform;

c. at least two equally spaced apart thin flexible horizontal bottom beams integrally connected to said lower section of said vertical cylindrical loading column and extending radially and integrally connected to said circumferential sidewall of said cylindrical shaped body;

d. at least two equally spaced apart thin flexible horizontal top beams all being angularly offset from said at least two equally spaced apart thin flexible horizontal bottom beams and integrally connected to said upper section of said vertical cylindrical loading column and extending radially and integrally connected to said circumferential sidewall of said cylindrical shaped body; and e. at least two equally spaced apart strain gages respectively attached to each said at least two equally spaced apart horizontal beams and lying generally on a horizontal plane for producing a voltage output proportional to the weight of said object;

f. whereby loading on said vertical cylindrical loading column creates deflection on said at least two horizontal top beams and similar deflection on said at least two horizontal bottom beams, thereby producing said voltage output proportional to the weight of said object that can accurately weigh said object during rotation of said rotary table.

27. The weighing device in accordance with claim 26 wherein said weighing device is made of metal.

28. A weighing device for determining the weight of an object and used in conjunction with a rotary machine which has a rotary table including at least one individual station with a connecting means, the at least one individual station has a weighing platform for holding a container means, the weighing device comprising:

a. a body having a sidewall with a bottom end and a top end, the bottom end having connecting means for mounting to said weighing device connecting means on said rotary table;

b. a vertical loading column located centrally within said body and having a lower section with a lower end above said rotary table and an upper section with an upper end adjacent to said top end of said sidewall of said body, the top end having connecting means for connecting to said weighing platform;

c. at least two equally spaced apart horizontal bottom beams integrally connected to said lower section of said vertical loading column and extending radially and integrally connected to said sidewall of said body;

d. at least two equally spaced apart horizontal top beams being angularly offset from said at least two equally spaced apart horizontal bottom beams and integrally connected to said upper section of said vertical loading column and extending radially and integrally connected to said sidewall of said body; and e. at least two equally spaced apart strain gages respectively attached to each said at least two equally spaced apart horizontal beams and lying on a horizontal plane for producing a voltage output proportional to the weight of said object;

f. whereby loading on said vertical loading column creates deflection on said at least two horizontal top beams and similar deflection on said at least two horizontal bottom beams, thereby producing said voltage output proportional to the weight of said object that can accurately weigh said object during rotation of said rotary table.

29. The weighing device in accordance with claim 28 wherein said weighing device is made of metal.

30. The weighing device in accordance with claim 28 wherein said body is generally a cylindrical shape.

31. The weighing device in accordance with claim 28 wherein said vertical loading column is generally a cylindrical shape.

32. A weighing device for determining the weight of an object while both the weighing device and the object are placed on a rotating table, the weighing device comprising:

a. a body having a sidewall with a first end attached to said rotating table and a second end;

b. a loading support located within said body and having a first end and a second end;

c. at least two bottom beams integrally connected to said loading support and adjacent to said second end and extending radially and integrally connected to said sidewall of said body;

d. at least two top beams being angularly offset from said at least two bottom beams and integrally connected to said loading support and adjacent to said first end and extending radially and integrally connected to said sidewall of said body; and e. means for producing a voltage output proportional to the weight of said object;

f. whereby loading on said loading support creates deflection on said at least two top beams and similar deflection on said at least two bottom beams, thereby producing said voltage output proportional to the weight of said object that can accurately weigh said object during rotation of said rotating table.

33. The weighing device in accordance with claim 32 wherein said weighing device is made of metal.

34. The weighing device in accordance with claim 32 wherein said body is generally a cylindrical shape.

35. The weighing device in accordance with claim 32 wherein said loading support is generally a cylindrical shape.

36. The weighing device in accordance with claim 32 wherein said loading support is generally in a vertical direction.

37. The weighing device in accordance with claim 32 wherein said at least two top and bottom beams are generally in a horizontal direction.

38. The weighing device in accordance with claim 32 wherein said means for producing a voltage output proportional to the weight of said object includes at least two strain gages respectively attached to each said at least two beams.

* * * * *